United States Patent [19]

Hughes

[11] Patent Number: 5,064,327
[45] Date of Patent: Nov. 12, 1991

[54] OBLIQUE POINT FASTENER

[75] Inventor: Barry J. Hughes, Wickford, R.I.

[73] Assignee: Research Engineeering & Manufacturing, Inc., Middletown, R.I.

[21] Appl. No.: 580,204

[22] Filed: Sep. 10, 1990

[51] Int. Cl.$^5$ ............................................. F16B 25/00
[52] U.S. Cl. ..................................... 411/386; 411/417
[58] Field of Search ............... 411/386, 387, 416, 417, 411/426, 411, 424, 418

[56] References Cited

U.S. PATENT DOCUMENTS

| | | | |
|---|---|---|---|
| 3,438,299 | 4/1969 | Gutshall | 411/387 |
| 3,724,315 | 4/1973 | Sygnator | 411/417 |
| 4,042,342 | 8/1977 | Muenchinger | 428/585 |
| 4,789,288 | 12/1988 | Peterson | 411/386 |
| 4,915,560 | 4/1990 | Peterson et al. | 411/386 |
| 4,952,110 | 8/1990 | Avgoustis et al. | 411/386 |

Primary Examiner—Neill R. Wilson
Attorney, Agent, or Firm—Trexler, Bushnell, Giangiorgi & Blackstone, Ltd.

[57] ABSTRACT

A blank and fastener formed from the blank for a thread-forming fastener which provides axially aligned driving. A tip portion of the blank is formed in a conical shape at an oblique angle to the shank portion of the blank. The blank formed as such is then formed with threads, however, the tip portion is formed with threads only about a portion of its outer surface. The resulting threaded fastener forms threads on an inside surface of a pilot hole in a workpiece in which it is inserted. The threaded fastener so formed minimizes driving effort and maintains proper alignment when the fastener is initially inserted and driven into an unthreaded pilot hole in a workpiece and also prevents cross-threading when the fastener is removed and reinserted into the workpiece.

14 Claims, 2 Drawing Sheets

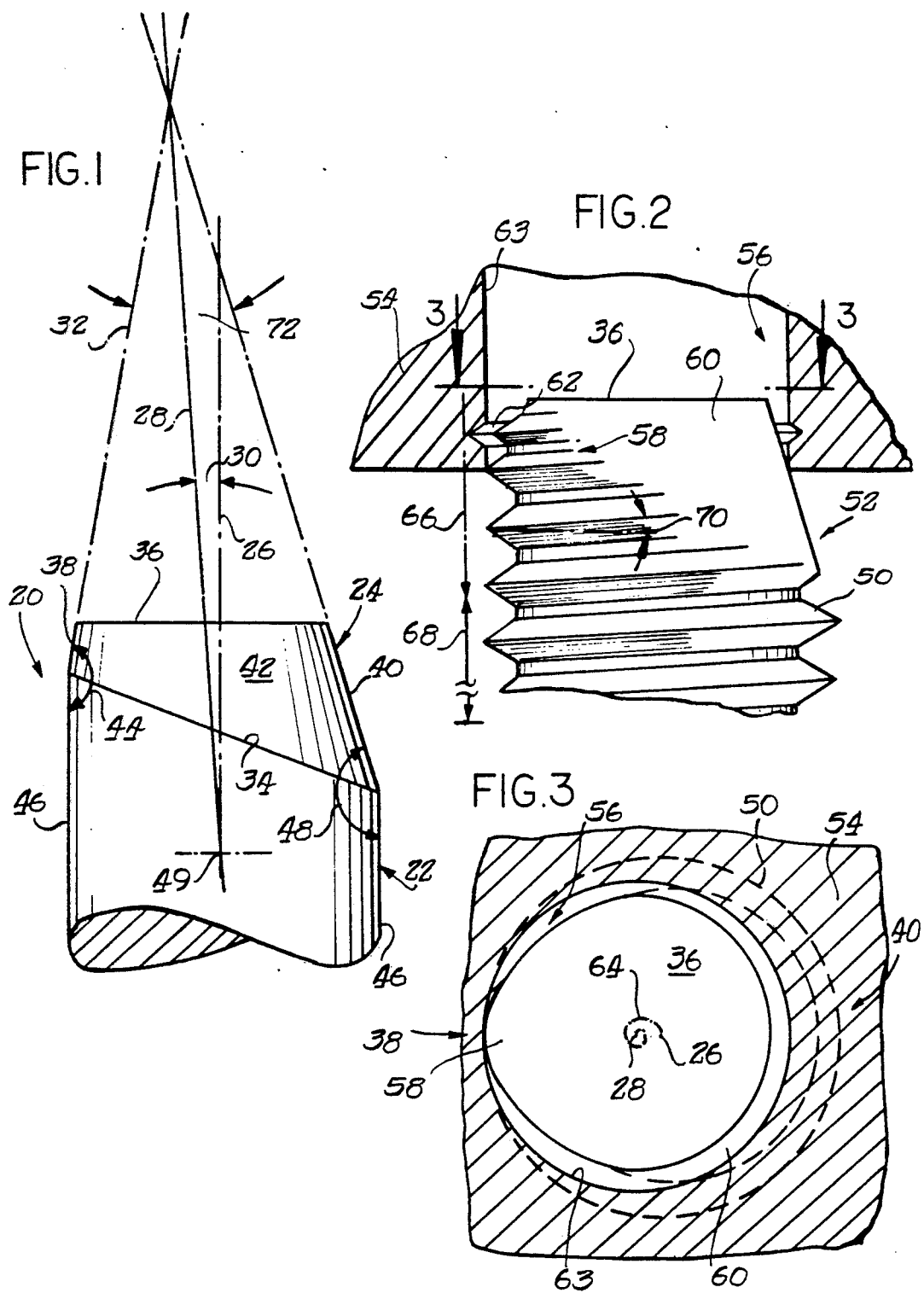

OBLIQUE POINT FASTENER

BACKGROUND OF THE INVENTION

This invention relates to blanks for thread-forming fasteners and thread-forming fasteners which are formed from such blanks.

It is extremely advantageous to provide a thread-forming fastener because of the resultant mechanical and material characteristics of the fastener connection. More particularly, a thread-forming fastener typically produces a more reliable threaded connection between the fastener and workpiece because the material is deformed and not removed from an inside surface of a hole formed through the workpiece.

In automated fastener insertion operations, it is desirable to provide a thread-forming fastener which minimizes required initial driving effort for thread-forming and maintains proper alignment of the fastener with the workpiece pilot hole. A general problem exists with typical thread-forming fasteners in that they easily become misaligned because their forming features connect with the workpiece pilot hole in a plane that approximates to the helix angle of the screw thread. As the forming feature follows the helix spiral of the screw thread, the workpiece internal thread will be axially misaligned to the design requirements of the assembly application. Furthermore, cross-threading may occur when initially starting a thread-forming fastener into a threaded hole whereby a minor shift in either the fastener or the workpiece may misalign the threads on the fastener and those formed in the threaded hole. Misaligned or crossed thread results in reducing the strength, reliability and quality of the fastener connection to the workpiece. For these reasons, thread-forming fasteners which don't provide cross-threading resistance features have not been as successful in automated installation operations.

As intimated above, self-alignment as well as cross-threading resistance features on a thread-forming fastener are also important when the fastener is removed from and substantially replaced or reinserted into the workpiece in which it formed threads. The design of prior art thread-forming fasteners promote further thread-forming even in a previously threaded hole, when the fastener threads are misaligned with the hole threads. For example, when a thread-forming fastener is removed from a hole in which it has formed threads, cross-threading may occur upon reinsertion of the fastener into the hole resulting in stripping or eliminating the threads inside of the hole. Stripped or eliminated threads in the hole provide little or no mechanical interface to retain the fastener in the workpiece thereby substantially degrading the quality of the fastener connection to the workpiece.

OBJECTS AND SUMMARY OF THE INVENTION

It is a general object of the present invention to provide a novel and improved thread-forming fastener and a blank therefor which minimizes driving effort and promote proper alignment with a pilot hole.

Another object of the present invention is to provide a thread-forming fastener which forms threads when it is inserted into a workpiece and does not cross the formed threads when removed from and reinserted into the workpiece.

Briefly, and in accordance with the foregoing, the present invention comprises a blank and fastener formed from the blank for a thread-forming fastener which prevents axial misalignment of the thread-forming fastener and pilot hole in the workpiece during the driving and thread-forming operation. A tip portion of the blank defines a cone formed oblique to the shank portion of the blank. The blank formed as such is then formed with threads such that the tip portion is formed with threads on only a portion of its outer surface. The resultant threaded fastener forms threads on an inside surface of a pilot hole in a workpiece in which it is inserted with minimum driving effort while maintaining axial alignment between fastener and pilot hole. The fastener also prevents cross-threading of the threads when the fastener is removed and reinserted into the workpiece.

BRIEF DESCRIPTION OF THE DRAWINGS

The organization and manner of the operation of the invention, together with the further objects and advantages thereof, may be understood best by reference to the following description taken in connection with the accompanying drawings wherein like reference numerals identify like elements and in which:

FIG. 1 is a side view of an end portion of a fastener blank in which a tip portion is a truncated cone formed oblique to a shank portion;

FIG. 2 is a partial sectional side view of a fastener in which the blank shown in FIG. 1 is formed with threads and the fastener is partially engaged within a pilot hole in a workpiece;

FIG. 3 is a sectional view taken generally along the line 3—3 in FIG. 2;

DESCRIPTION OF THE ILLUSTRATED EMBODIMENT

Figure 4:
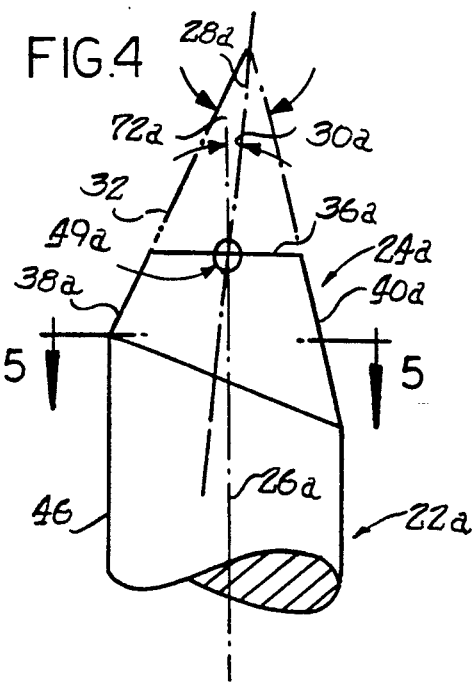
FIGS. 4 and 5 are views similar to FIGS. 1 and 2 showing a modified form.
Figure 6:
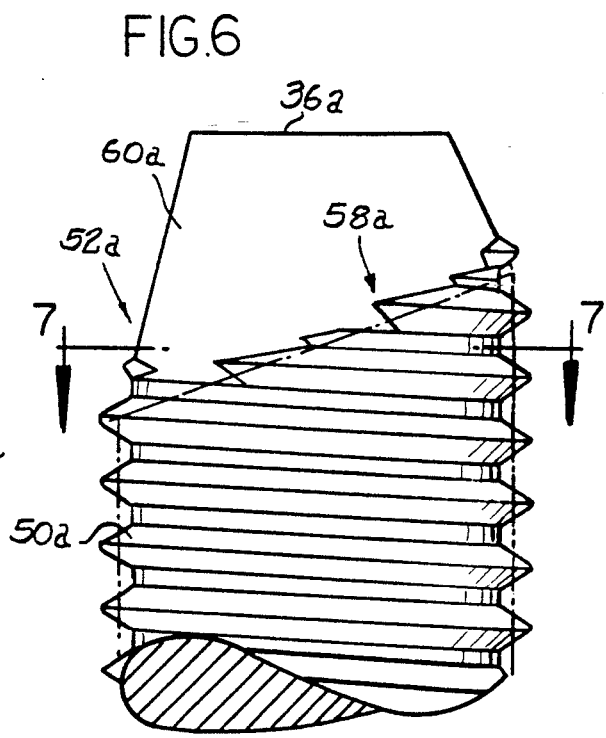
FIGS. 6 and 7 are views taken generally along the lines 6—6 and 7—7 of FIGS. 4 and 5, respectively.
Figure 5:
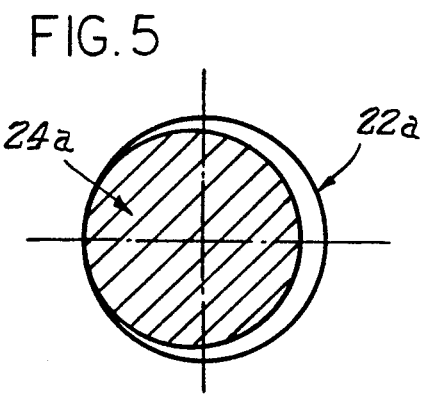
Figure 7:
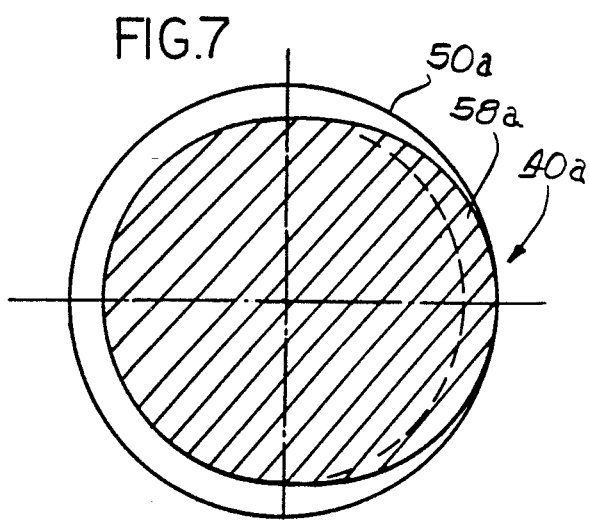

While this invention may be susceptible to embodiment in different forms, there is shown in the drawings and will be described herein in detail, a specific preferred embodiment with the understanding that the present disclosure is to be considered an exemplification of the principles of the invention and is not intended to limit the invention to the embodiment illustrated and described herein.

It should be noted that dimensional relationships between elements of the illustrated embodiment may vary in practice or may have been varied in the illustration to emphasize certain features of the invention.

Referring now to the drawings wherein like parts are designated by the same reference numerals throughout the figures, a portion of a fastener blank 20 is shown in FIG. 1. Similar elements in the alternate form shown in FIGS. 4–7 are designated by like reference numerals with the suffix a. The fastener blank 20 has a shank portion 22 and a tip portion 24 formed on the end thereof. A shank axis 26 extends through the center of the shank portion 22 and a tip axis 28 extends through the center of the tip portion and at an oblique angle 30 to the shank axis 26.

The tip portion 24 defines a cone 32 (indicated in phantom line) formed on the end of the shank portion 22 and joining the same along a sloped boundary 34. An end surface 36 of the tip portion 24 is formed in a plane generally perpendicular to the shank axis 26 when the cone 32 is truncated, as is preferable, although not essential to the invention. The entire cone 32 need not be formed and then truncated, rather, the tip portion 24 is typically formed in the truncated shape as shown in FIG. 1. For simplicity in referring to the tip portion 24 throughout the rest of the application, a left side of the tip portion 24 as viewed in FIG. 1 will be identified as a short side 38 and a right side of the tip portion 24 as viewed in FIG. 1 will be referred to as a long side 40. The short side 38 and the long side 40 are 180° apart when viewed from the aspect of the blank or fastener as illustrated in FIGS. 1 and 2.

As indicated in FIG. 1, the tip axis 28 and the shank axis 26 are not coaxial or even parallel, but are formed at an oblique angle 30 and therefore result in an outside conical surface 42 of the tip portion being formed at a range of angles as measured relative to and around the shank axis 26. The tip portion 24 is in effect "tilted" so that the tip axis 28 is angled relative to the shank axis 26. Intersection 49 between axes 26 and 28 defines the degree of eccentricity between shank axis 26 and the tip axis 28 at the surface 36, as best viewed in FIG. 3. For example, this range of angles can be seen by comparing a maximum angle 44 formed between the short side 38 and an adjacent side 46 of the shank portion 22 and a minimum angle 48 formed between the long side 40 and an adjacent side 46 of the shank portion 22. Since angle 48 of the long side 40 is smaller than the angle 44 of the short side 38, the long side 40 is a steeper side than the short side 38 relative to the shank 46, which is preferably, although not necessarily a right cylinder in form. The eccentricity of the tip and shank axes 28, 26, provides novel results as described hereinbelow.

Furthermore, as shown in FIG. 4, the intersection of the tip axis 26a and the shank axis 28a can occur on the plane 36a without any eccentricity illustrating a further embodiment of the invention. In the case of FIG. 4, it will be noted that the spiral eccentric thread-forming action progresses from zero at intersection 49a at start and increases to a maximum at the intersection of sides 40a and 46a.

Referring to FIG. 2, the fastener blank 20 has been subjected to a thread rolling operation to form spaced apart threads 50 on the blank 20 to produce the threaded fastener as illustrated in FIG. 2. The threaded fastener 52 is positioned in and partially threaded into a workpiece 54 having an unthreaded pilot hole 56 whereby the fastener 52 begins to form threads in the pilot hole 56. It will be noted that as a result of forming the fastener thread 50 on the blank 20 shown and described in FIG. 1 and FIG. 4 using conventional roll dies, tip threads 58 are formed only about a limited circumferential extent adjacent the short side 38 of the tip portion 24. These tip threads 58 are formed along with the spaced apart threads 50 on the shank 22 by rolling the fastener blank 20 using conventional rolling dies (not shown). Since the short side 38 is formed at an angle 44 to the shank side 46 which is greater than the angle 48 formed between the long side 40 and the shank side 46 the threads 58 as formed thereon generally extend for a limited circumferential distance about the outside surface 42 of the tip portion 24. Opposite the threads 58 is a semi-conical unthreaded surface 60 into which the threads 58 fade. This unthreaded surface portion extends for a limited circumferential distance adjacent side 40. The threads 58 may be full or partial threads at their maximum extent depending on the form of roll die used.

FIG. 3 is a sectional view taken along line 3—3 in FIG. 2 illustrating the generally egg-like shape of the fastener 52 when so viewed. The end surface 36 of the tip portion 24 is thus also egg shaped and not simply oval or elliptical. As shown, the long side 40 helps to wedge the fastener 52 in the pilot hole 56. Rotation of the fastener 52 in the pilot hole 56 creates a camming action of the unthreaded surface 60 of the long side 40, acting as a stable bearing surface, against the inside surface of the pilot hole 56. Continued rotation forces the threads 58 formed adjacent the short side 38 into the material of the workpiece 54 which will result in forming cooperative female threads 62 on the inside surface 63 of the pilot hole 56.

This camming action can be seen further by a spiral path 64 traced by the tip axis 28 about and focusing in on the shank axis 26, as the fastener 52 is rotated about the shank axis 26. Because of the angle 30 between the shank and tip axes 26, 28, the tip axis 28 follows the generally eccentric spiral path 64 about shank axis 26. The spiral thread-forming action can be reversed as shown by the difference between FIGS. 1 and 4 without detriment to the thread-forming ability. The eccentricity of the path 64 decreases or increases in general relation with the helix 70 of the thread 50 to zero or maximum when the spaced threads 50 of the shank 22 have fully engaged the female threads 62 formed in the pilot hole 56. Thus, during initial thread-forming, the tip threads 58 rotate in either an increasing or decreasing spiral path 64 in direct relation with the helix 70 of the screw threads.

Furthermore, the tip threads 58 have a reduced curvature and very limited circumferential span (i.e. they are generally formed on the tip of the egg shape) initially producing essentially point contact within the inside surface 63 of pilot hole 56. This condition provides relief and clearance for minimum driving effort. As driving progresses, the tip threads 58 apply circumferential as well as radial outward pressure. As noted, the transition from tip threads 58 to shank threads 50 is smooth because this intersection is a three dimensional development (i.e. not perpendicular to shank axis 26).

The tip threads 58 and unthreaded surface 60 and spaced shank threads 50 form two zones on the threaded fastener 52. A first zone 66 includes the unthreaded surface 60 and the tip threads 58. The unthreaded surface 60 engages the pilot hole 56 and when the fastener 52 is rotated the tip threads 58 begin the initial thread-forming process in the workpiece 54. As fastener 52 rotation is continued, the spaced threads 58 in a second zone 68 complete the formation of the workpiece threads 62 initiated by the threads 58 in the first zone 66.

When the threaded fastener 52 is removed from the threaded hole, the geometry of the threaded fastener 52 prevents cross-threading when the same or another like-configured threaded fastener 52 is reinserted into the hole. The cross-threading resistance feature is important to prevent the threads 58, 50 from cross-threading the formed female threads 62 which would result in stripping or obliterating the female threads 62. Cross-threading is avoided through the mechanical characteristics of the above-described geometry of the truncated cone forming the tip portion 24 and the thread pattern formed thereupon. Since the area about the shorter side 38 receives threads 58 thereon and the area about the longer side 40 generally does not receive any threading and instead has an unthreaded surface 60, initial point contact engagement of the tip threads 58 with the formed female threads 62 is facilitated.

Unlike typical prior art thread-forming fasteners, the unthreaded surface 60 meshes against but does not engage the female threads 62 in a locked threaded engagement, thereby developing a wedging or camming action for encouraging proper alignment of the shank with the threaded hole and initial essential point engagement of the threads 58 with the female threads 62. Since the transition from partially circumferentially extending tip threads 58 to fully circumferentially extending shank threads 50 is gradual, there is a smooth and gradual engagement of full threads of both shank 22 and workpiece 54 upon further rotation. This characteristic of the present invention prevents overlapping or crossed threads.

With more specificity as to the geometric ranges of the present invention, the oblique angle 30, defining the degree of angularity of the truncated conical tip portion 24, may be from substantially on the order of 2° to substantially on the order of 20°, but is preferably approximately 5°. The oblique angle 30 may thus be greater or less than 5° but should exceed a helix or lead angle 70 of the threads 50. The oblique angle 30 relates to the axial movement which results when driving the threaded fastener 52 into a workpiece 54. An included angle 72 of the conical tip 24 may range from generally substantially on the order of 10° to substantially on the order of 50° and should exceed the oblique angle 30 to effectively operate as an entry lead for the threaded fastener 52.

While preferred embodiments of the present invention are shown and described, it is envisioned that those skilled in the art may devise various modifications of the present invention without departing from the spirit and scope of the appended claims.

The invention is claimed as follows:

1. A cross-threading resistant screw fastener, said fastener comprising a shank portion, a conical tip portion formed on and extending from said shank portion; said shank portion defining a shank axis extending therethrough, and said conical tip portion defining a tip axis extending therethrough; said tip being formed such that said tip axis defines an angle oblique to said shank axis; shank threads formed on said shank portion and at least partial threads formed on at least a portion of said conical tip portion.

2. A cross-threading resistant thread-forming screw fastener, said fastener comprising a shank portion, a conical tip portion formed on and extending from said shank portion; said shank portion defining a shank axis extending therethrough, and said conical tip portion defining a tip axis extending therethrough; said tip being formed such that said tip axis defines an angle oblique to said shank axis; shank threads formed on said shank portion and at least partial threads formed on at least a portion of said conical tip portion.

3. A blank for making a thread-forming screw fastener comprising a shank portion, a conical tip portion formed on and extending from said shank portion; said shank portion defining a shank axis extending therethrough, and said conical tip portion defining a tip axis extending therethrough; said tip being formed such that said tip axis defines an angle oblique to said shank axis.

4. A blank for making a thread-forming screw fastener according to claim 1, wherein said conical tip portion is formed with a cone angle at least as great as said angle oblique to said shank axis defined by said tip axis.

5. A blank for making a thread-forming screw fastener according to claim 1, wherein said oblique angle between said shank axis and said tip axis is from substantially on the order of 2° to substantially on the order of 20°.

6. A blank for making a thread-forming screw fastener according to claim 1, wherein an included angle of said conical tip portion is from substantially on the order of 20° to substantially on the order of 50°.

7. A blank for making a thread-forming screw fastener according to claim 3, wherein an included angle of said conical tip portion is from substantially on the order of 10° to substantially on the order of 50°.

8. A thread-forming screw fastener, said fastener comprising a shank portion, a conical tip portion formed on and extending from said shank portion; said shank portion defining a shank axis extending therethrough, and said conical tip portion defining a tip axis extending therethrough; said tip being formed such that said tip axis defines an angle oblique to said shank axis; shank threads formed on said shank portion and at least partial threads formed on at least a portion of said conical tip portion.

9. A thread-forming screw fastener according to claim 6, wherein said conical tip portion defines a conical outer surface which progresses in continuous fashion from a minimum interior angle measured relative to an adjacent surface of said shank to a maximum interior angle measured relative to an adjacent surface of said shank, a portion of said outer conical surface adjacent the area thereof defining said maximum angle being formed with at least partial threads and a portion of said outer conical surface adjacent the area thereof defining said minimum angle being at least partially unthreaded.

10. A thread-forming screw fastener according to claim 7, wherein said conical tip portion is truncated, defining an end surface formed in a plane generally perpendicular to said shank axis and a base defining a boundary between said tip portion and said shank portion and formed at an oblique angle relative to said end surface; a portion of said outer conical surface adjacent the area thereof defining said maximum angle having a dimension measured between said end face and said base of said truncated conical tip portion being shorter than a like-measured dimension of a portion of said outer conical surface adjacent the area thereof defining a minimum angle.

11. The thread-forming screw fastener according to claim 6, wherein said shank threads define a lead angle less than the oblique angle formed between said shank and tip axes for promoting axial movement of said fastener when driven into a pilot hole.

12. A thread-forming screw fastener according to claim 6, wherein said oblique angle formed between said tip axis and said shank axis is substantially on the order of 5°.

13. A thread-forming screw fastener according to claim 6, wherein said oblique angle between said shank axis and said tip axis is from substantially on the order of 2° to substantially on the order of 10°.

14. A thread-forming screw fastener according to claim 6, wherein an included angle of said conical tip portion is from substantially on the order of 10° to substantially on the order of 50°.

* * * * *